United States Patent
Tsujii et al.

[11] Patent Number: 5,930,397
[45] Date of Patent: Jul. 27, 1999

[54] APPARATUS AND METHOD FOR PROCESSING IMAGE SIGNAL

[75] Inventors: Satoshi Tsujii; Makoto Yamada, both of Tokyo, Japan

[73] Assignee: Sony Corporation, Tokyo, Japan

[21] Appl. No.: 08/700,783

[22] Filed: Aug. 22, 1996

[30] Foreign Application Priority Data

Aug. 31, 1995 [JP] Japan ................................. 7-223448

[51] Int. Cl.⁶ ........................... H04N 1/41; H04N 1/417; H04N 1/415

[52] U.S. Cl. ........................ 382/239; 382/246; 382/250; 382/264; 382/258; 382/299; 358/426; 358/432; 358/430

[58] Field of Search ................... 382/239, 248, 382/238, 264, 260, 298, 246, 299, 244, 232, 263, 250, 251, 258; 358/433, 432, 426, 261.2, 430, 445, 451, 448, 463, 465, 464, 261.1, 427; 348/390, 424, 441

[56] References Cited

U.S. PATENT DOCUMENTS

| | | | |
|---|---|---|---|
| 4,912,569 | 3/1990 | Petilli | 358/463 |
| 5,014,198 | 5/1991 | Umemura | 382/232 |
| 5,040,233 | 8/1991 | Davy et al. | 382/239 |
| 5,060,286 | 10/1991 | Miller | 382/239 |
| 5,204,756 | 4/1993 | Chevion et al. | 358/426 |
| 5,253,059 | 10/1993 | Ansari et al. | 348/390 |
| 5,303,060 | 4/1994 | Iwamura et al. | 348/390 |
| 5,517,581 | 5/1996 | Johnston et al. | 382/239 |
| 5,553,160 | 9/1996 | Dawson | 382/239 |
| 5,644,658 | 7/1997 | Sugahara et al. | 382/239 |
| 5,719,962 | 2/1998 | Sugahara et al. | 382/239 |
| 5,732,156 | 3/1998 | Watanabe et al. | 382/239 |

*Primary Examiner*—Edward L. Coles
*Assistant Examiner*—Cheukfan Lee
*Attorney, Agent, or Firm*—Limbach & Limbach LLP

[57] ABSTRACT

An image signal processor and an image signal processing method arranged to limit a deterioration in image quality at the time of compression and expansion at a low coding rate. Data of an input image undergoes pre-processing in a pre-processing unit before being compressed by a compressor unit in accordance with the MPEG method. An information amount prediction processor calculates activity representing the complexity of the image input through an image input unit, and sets filter coefficients and the number of pixels of an output image according to the activity such that the amount of information of a picture to be compressed is reduced. The information amount prediction processor supplies a filter processor and a thinning-out processor with the filter coefficients and the number of pixels, respectively. The filter processor performs filtering with the filter coefficients, and the thinning-out processor converts the input image so that the output image has the set number of pixels.

6 Claims, 13 Drawing Sheets

3:1.5:0 (3/4 CONVERSION)

FIG.10D 2.6:1.3:0 (2/3 CONVERSION)

FIG.10E

2:1:0 (1/2 CONVERSION)

IF N=2,
|(PIXEL VALUE) − (AVERAGE OF FIVE PIXELS)|

APPARATUS AND METHOD FOR PROCESSING IMAGE SIGNAL

BACKGROUND OF THE INVENTION

1. Field of the Invention

The present invention relates to an apparatus and a method for processing an image signal and more, particularly, to an image signal processor and an image processing method in which data of an image is compressed at a fixed coding rate, and which have, as a pre-processing before compression processing, a step of converting the image so that the amount of information corresponding to high-frequency components of the values of pixels in the image is reduced.

2. Description of the Related art

When a digital image is recorded on a predetermined recording medium, the amount of data of the image to be recorded can be reduced by using compression processing represented by processing in accordance with the Moving Picture Experts Group (MPEG). By such compression processing, the amount of data after processing can be varied. However, if the amount of data after compression is excessively small, digital noises such as block noise and mosquito noise become perceptible, resulting in a deterioration in image quality after expansion. To prevent such a deterioration in image quality after expansion processing, therefore, a certain amount of data is required after compression.

Conventionally, image data is processed in a tentative way (first-path processing) before it is actually compressed, and a coding rate is determined according to the amount of data by considering the capacity of a transmission line and a recording medium and so on. Thereafter, the data is actually compressed (second-path processing). In this manner (by variable rate coding), a deterioration in image quality after compression and expansion of the image can be prevented.

In the conventional art, if an image is encoded by only one path of compression processing and if the encoded data is transmitted through a transmission line and recorded on a recording medium, it is necessary to change (increase) the coding rate and to sufficiently increase the capacity of the transmission path and the recorded medium (in the case of apparatuses for business use or for reproduction only).

It is possible that coding is performed at a low coding rate which is not allowed to be changed, as in the case of an apparatus operated both for recording and for reproduction by a user. In such a case, coding is possible if the amount of data is always small. However, a deterioration in image quality after expansion results under such a condition. Thus, in the conventional art, it is difficult to achieve real time coding (by only one path of compression processing) without causing a deterioration in image quality after expansion.

SUMMARY OF THE INVENTION

In view of the above-described circumstances, an object of the present invention is to provide an image signal processor and an image signal processing method arranged to limit a deterioration in image quality after compression and expansion of an image even if the coding rate is low.

To achieve this object, according to one aspect of the present invention, there is provided an apparatus for processing an image signal, comprising calculation means for calculating activity in one picture of a digital image signal, conversion means for converting the digital image signal according to the activity so that the amount of information at the time of compression of the digital image signal is reduced, and compression means for compressing the converted digital image signal at a fixed coding rate.

According to another aspect of the present invention, there is provided a method of processing an image signal, comprising the steps of calculating activity in one picture of a digital image signal, converting the digital image signal according to the activity so that the amount of information at the time of compression of the digital image signal is reduced, and compressing the converted digital image signal at a fixed coding rate.

DESCRIPTION OF THE PREFERRED EMBODIMENT

Figure 1:
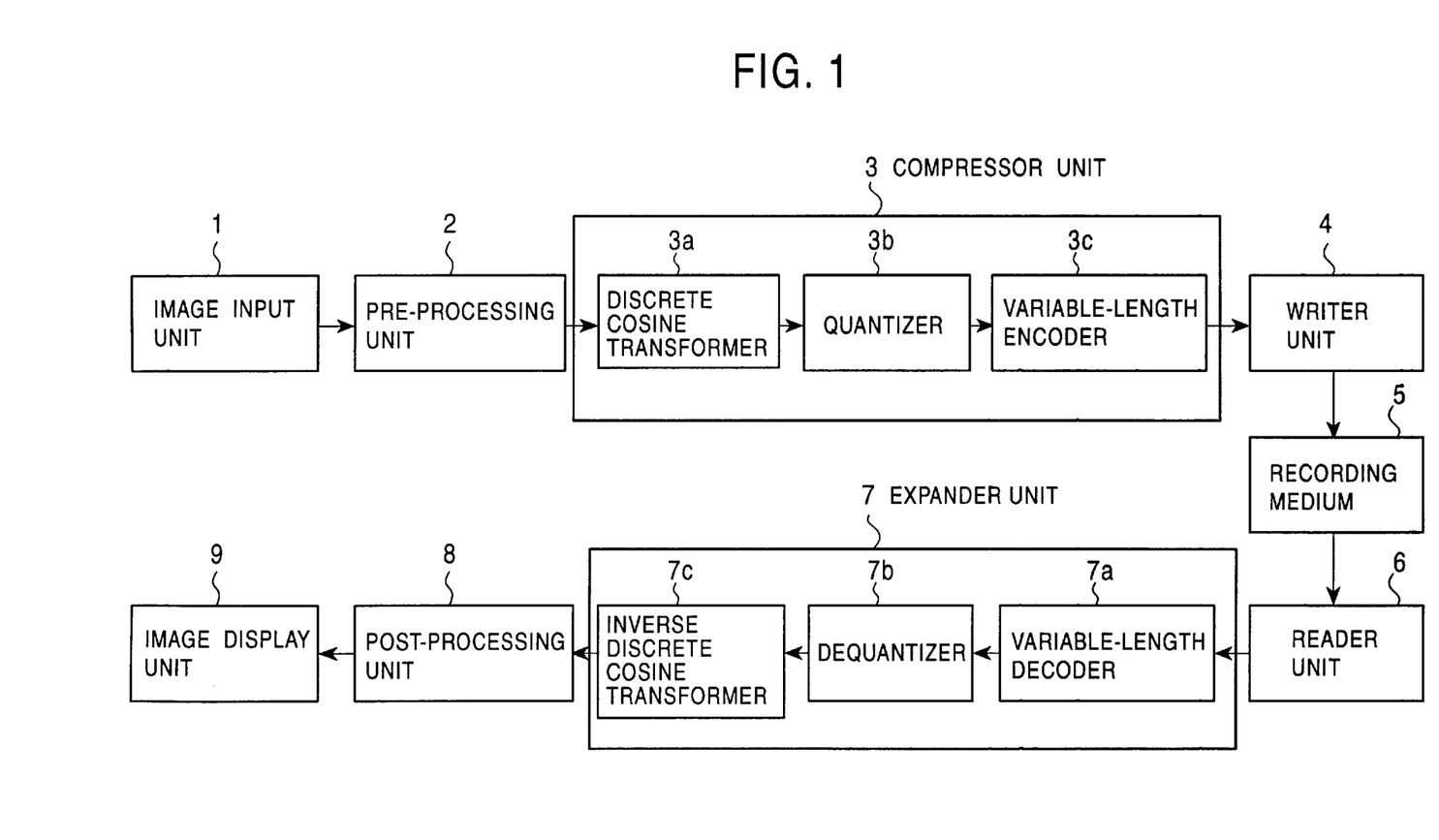
FIG. 1 is a block diagram showing the configuration of an image signal processor which represents an embodiment of the present invention.

Fig. shows the configuration of an image signal processor which represents an embodiment of the present invention. This image signal processor has a pre-processing unit 2 which is arranged to calculate the activity of an image supplied from an image input unit 1 and to perform filtering and thinning-out processing on the basis of the calculated activity value. The activity is evaluated as an index of the complexity of the image in terms of spatial inclination, frequency components or the like of the image in one picture.

A compressor unit 3 has a discrete cosine transformer (DCT) 3a, a quantizer 3b, and a variable-length encoder 3c. Image data output from the pre-processing unit 2 is input to the DCT 3a. The DCT 3a transforms this image data in a orthogonal transform manner by performing discrete cosine transformation. The image data thereby transformed is quantized by the quantizer 3b and is thereafter encoded by the variable-length encoder 3c. This encoded (compressed) image data is supplied to a writer unit 4. The writer unit 4 writes this image data on a recording medium 5.

A reader unit 6 reads image data written on the recording medium 5 and outputs the read image data to an expander unit 7.

The expander unit 7 has a variable-length decoder 7a, a dequantizer 7b and an inverse DCT 7c. The variable-length decoder 7a is arranged to decode the encoded image data supplied from the reader unit 6. The image data thereby decoded is dequantized by the dequantizer 7b and is transformed by inverse discrete cosine transformation in the inverse DCT 7b. The image data is thereafter supplied to a post-processing unit 8.

The post-processing unit converts the number of pixels (resolution) of the image data supplied from the expander unit 7 in correspondence with the processing in the pre-processing unit 2, and outputs the converted data to an image display unit 9. The image display unit changes the digital image data into analog data and displays a corresponding moving image.

Figure 2:
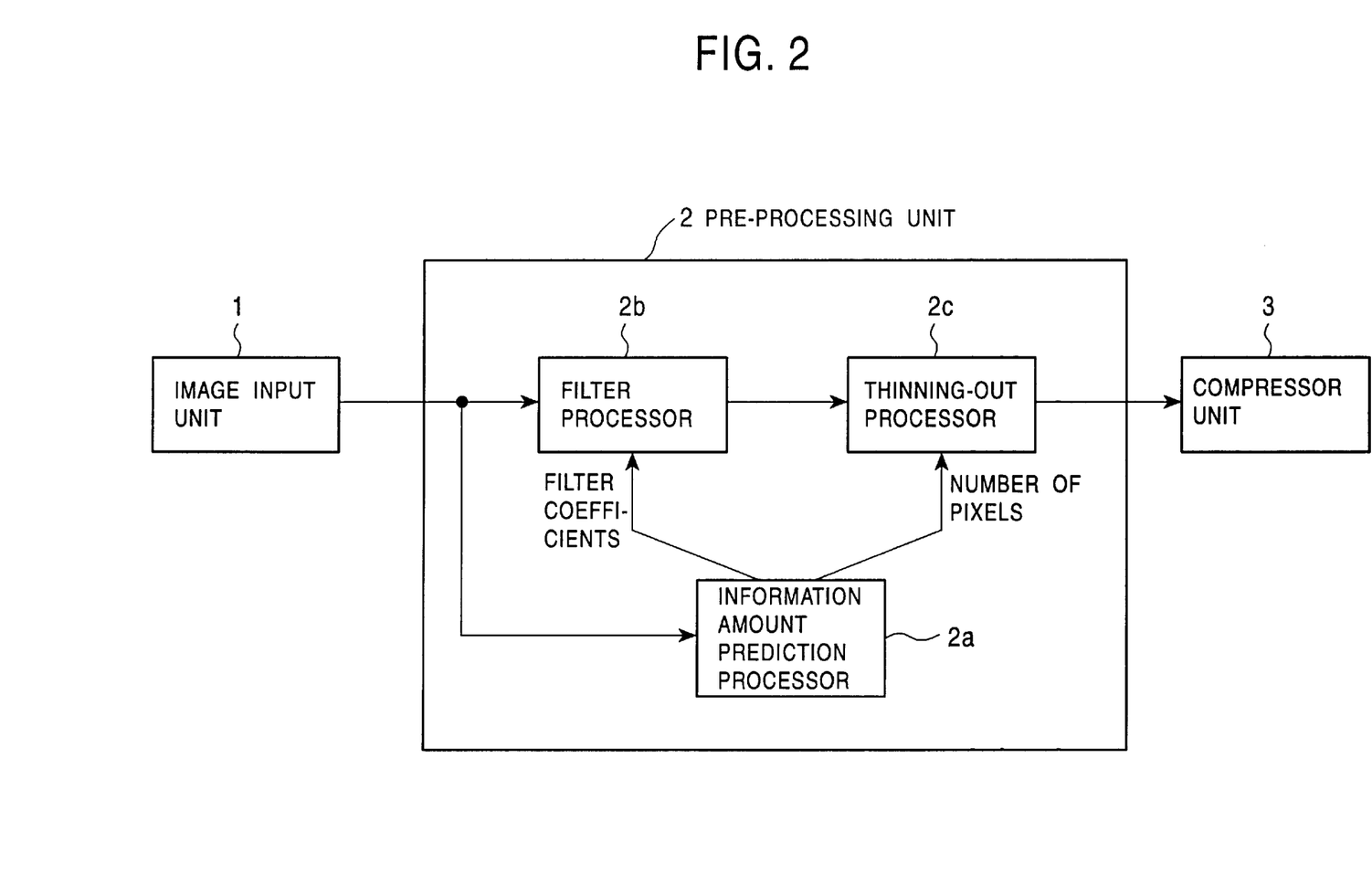
FIG. 2 is a block diagram showing the configuration of an example of pre-processing unit 2 of the embodiment shown in FIG. 1.

FIG. 2 shows the configuration of an example of the pre-processing unit 2. This example of the pre-processing unit 2 has an information amount prediction processor 2a (calculation means), a filter processor 2b (conversion means) and a thinning-out processor 2c (conversion means). The information amount prediction processor 2a calculates the activity representing the complexity of an image supplied from the image input unit 1, and sets filter coefficients from the activity. The information amount prediction processor 2a sets a cut-off frequency by supplying the filter coefficients to the filter processor 2b. Further, the information amount prediction processor 2a sets the number of pixels of an output image from the activity and supplies the number of pixels to the thinning-out processor 2c.

The filter processor 2b filters the input image with the filter coefficients supplied from the information amount prediction processor 2a to cut high-frequency components of the image.

The thinning-out processor 2c converts the number of pixels of the image output from the filter processor 2b according to the number of pixels supplied from the information amount prediction processor 2a.

Figure 3:
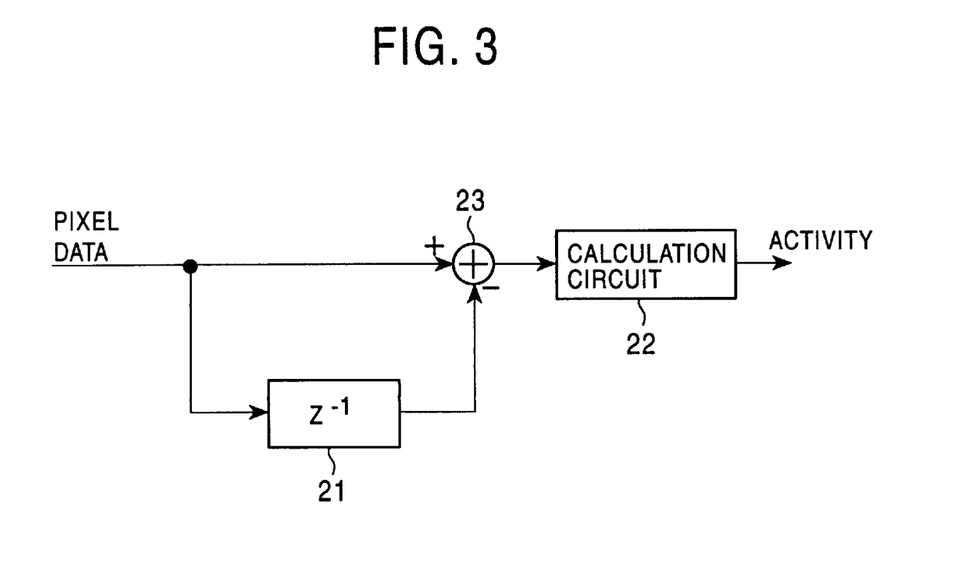
FIG. 3 is a block diagram showing the configuration of an example of an activity calculation circuit incorporated in information amount prediction processor 2a of the embodiment shown in FIG. 1.
Figure 4:
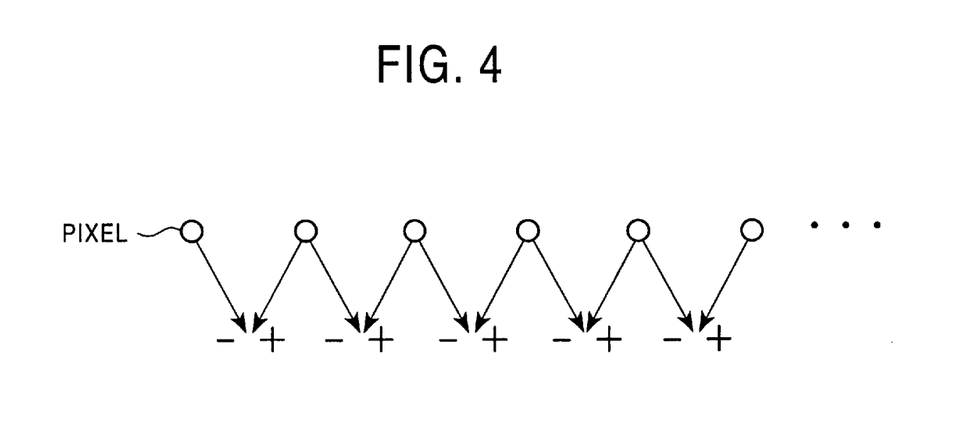
FIG. 4 is a diagram for explaining the principle of calculation of activity in the circuit shown in FIG. 3.

FIG. 3 shows the configuration of an example of an activity calculation circuit for calculating activity in the information amount prediction processor 2a. In this example, each of pixel data items input in sequential order is held for one clock period by a delay circuit 21. When the next pixel data item is input, the pixel data item held by the delay element 21 is output to an adder 23. The adder 23 calculates the difference between the held pixel data item and the newly-input pixel data item, thus calculating the difference between the values of each of pairs of pixels horizontally adjacent to each other as shown in FIG. 4. A calculation circuit 22 calculates the absolute value of this difference. The calculation circuit 22 calculates the absolute values with respect to all the pixel data in one frame and outputs the sum total of the absolute values as activity.

In this example, therefore, the value of activity becomes larger if the values of the pixels in one image frame vary frequently. Activity A calculated in this example can be expressed by the following equation:

$$A = \sum_{j=1}^{n} \sum_{i=2}^{m} |d(i, j) - d(i-1, j)|$$

where d(i, j) is the value of the ith pixel in the jth line, n is the number of lines in one frame and m is the number of pixels in one line.

Figure 5:
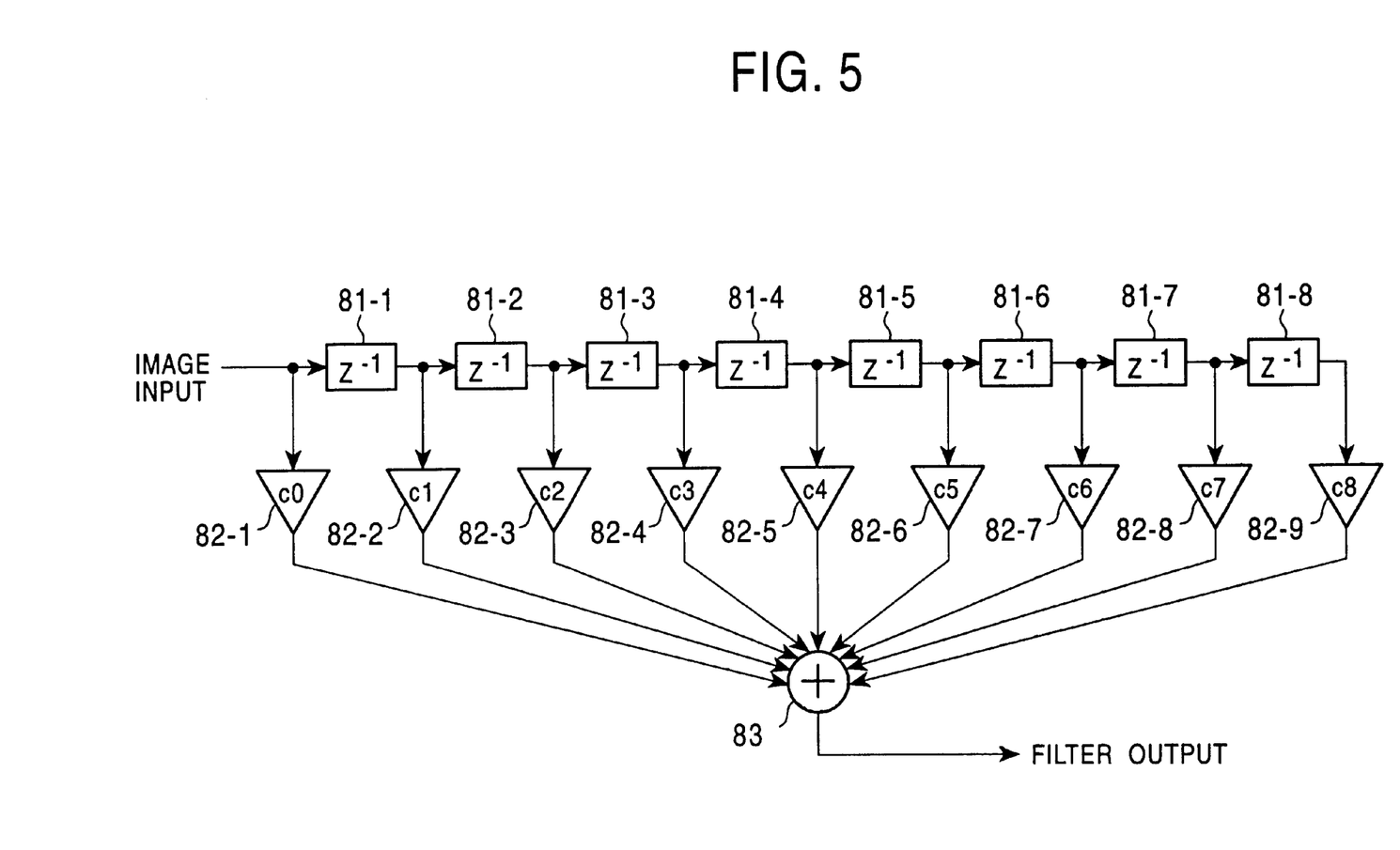
FIG. 5 is a block diagram showing the configuration of filter processor 2b of the example shown in FIG. 2.

FIG. 5 shows the configuration of an example of the filter processor 2b. This example is a 9-tap unidimensional finite impulse response (FIR) digital filter having eight delay elements 81-1 to 81-8. Input image data is first held for one clock period by the delay element 81-1. When the next image data is input, the image data held by the delay element 81-1 is output to the delay element 81-2. Similarly, the image data held by each of the delay elements 81-2 to 81-7 is output to the corresponding one of the subsequent delay elements 81-3 to 81-8.

Image data newly input is multiplied by a filter coefficient c0 by a multiplier 82-1, and image data held by each of the delay elements 81-1 to 81-8 is multiplied by the corresponding one of the filter coefficients c1 to c8 by the corresponding one of multipliers 82-2 to 82-9. A total of nine image data items thereby obtained are supplied to an adder 83. The adder 83 calculates the sum total of the image data multiplied by the filter coefficients by the multipliers 82-1 to 82-9, and outputs the value of the sum total. The multipliers 82-1 to 82-9 are supplied with the filter coefficients from the information amount prediction processor 2a.

Figure 6:
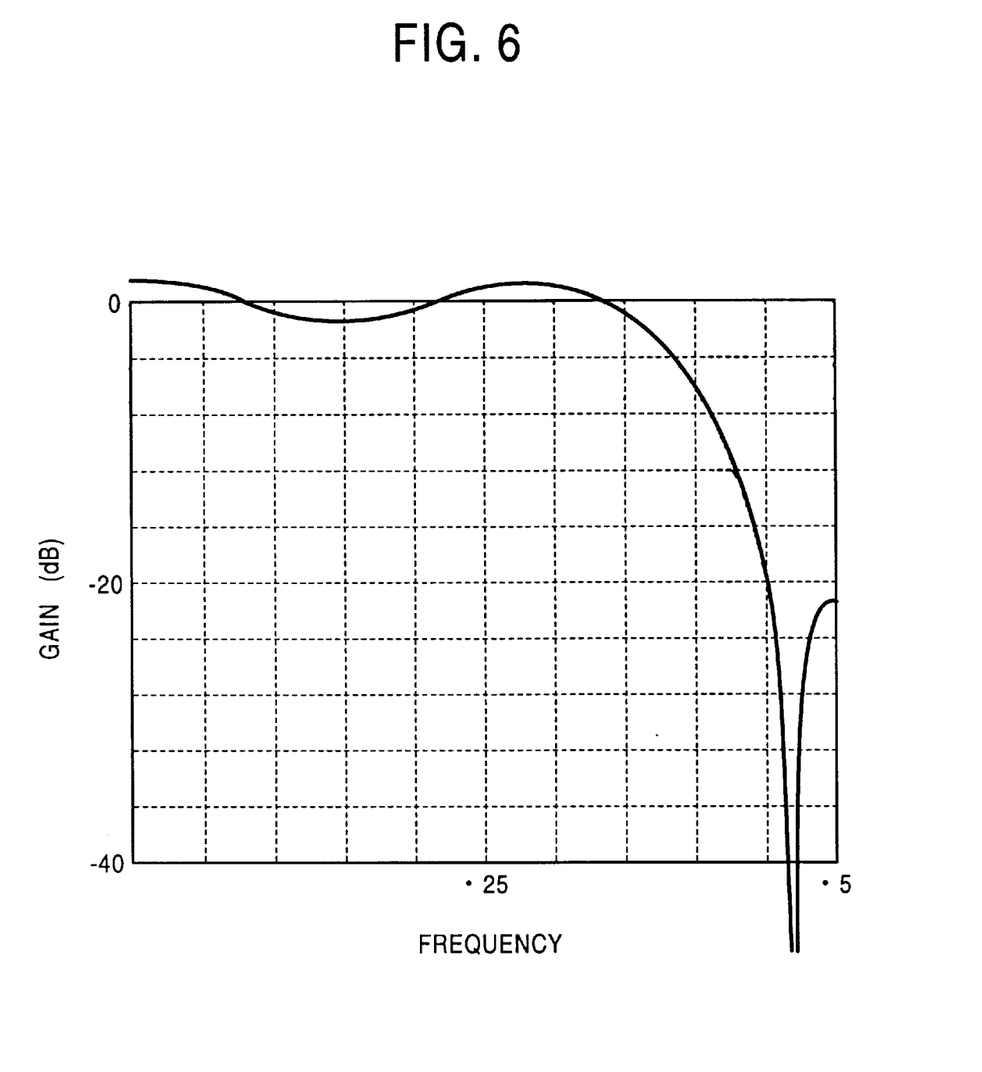
FIGS. 6 through 9 are graphs showing examples of a frequency characteristic in the example shown in FIG. 5.

FIG. 6 shows an example of a frequency characteristic of the filter processor 2b. If a filter coefficient set Cf1 is supplied from the information amount prediction processor 2a as filter coefficients c0 to c8 for the multipliers 82-1 to 82-9, a frequency characteristic such as that shown in FIG. 6 is set according to this filter coefficient set Cf1.

Figure 7:
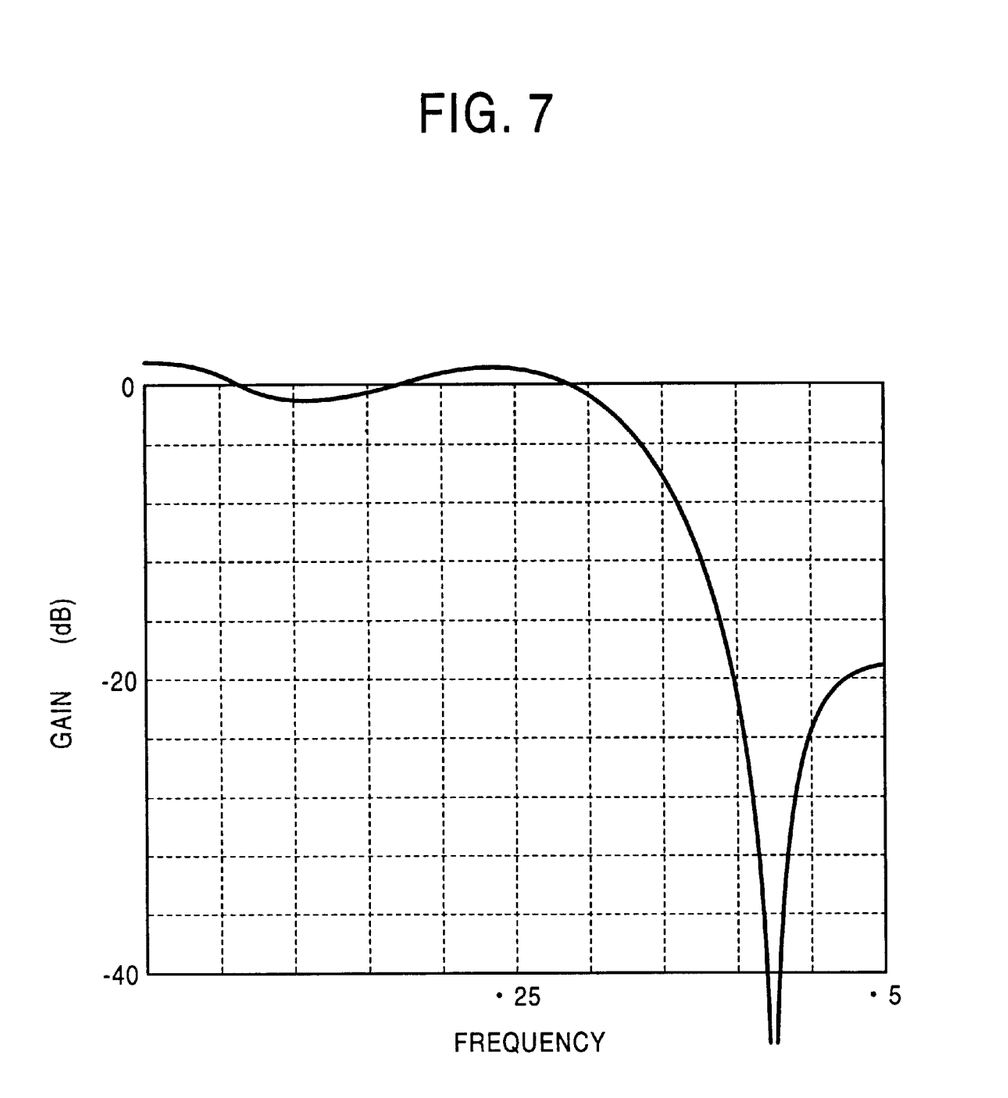
Figure 8:
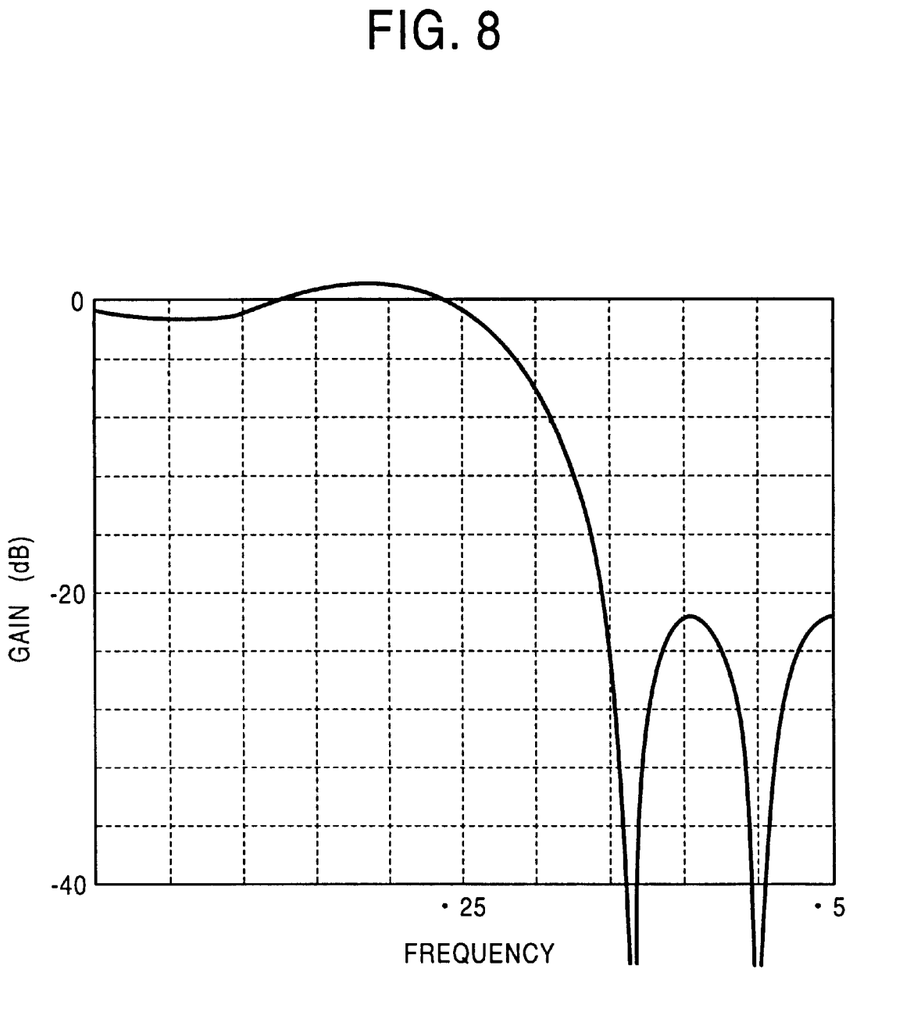
Figure 9:
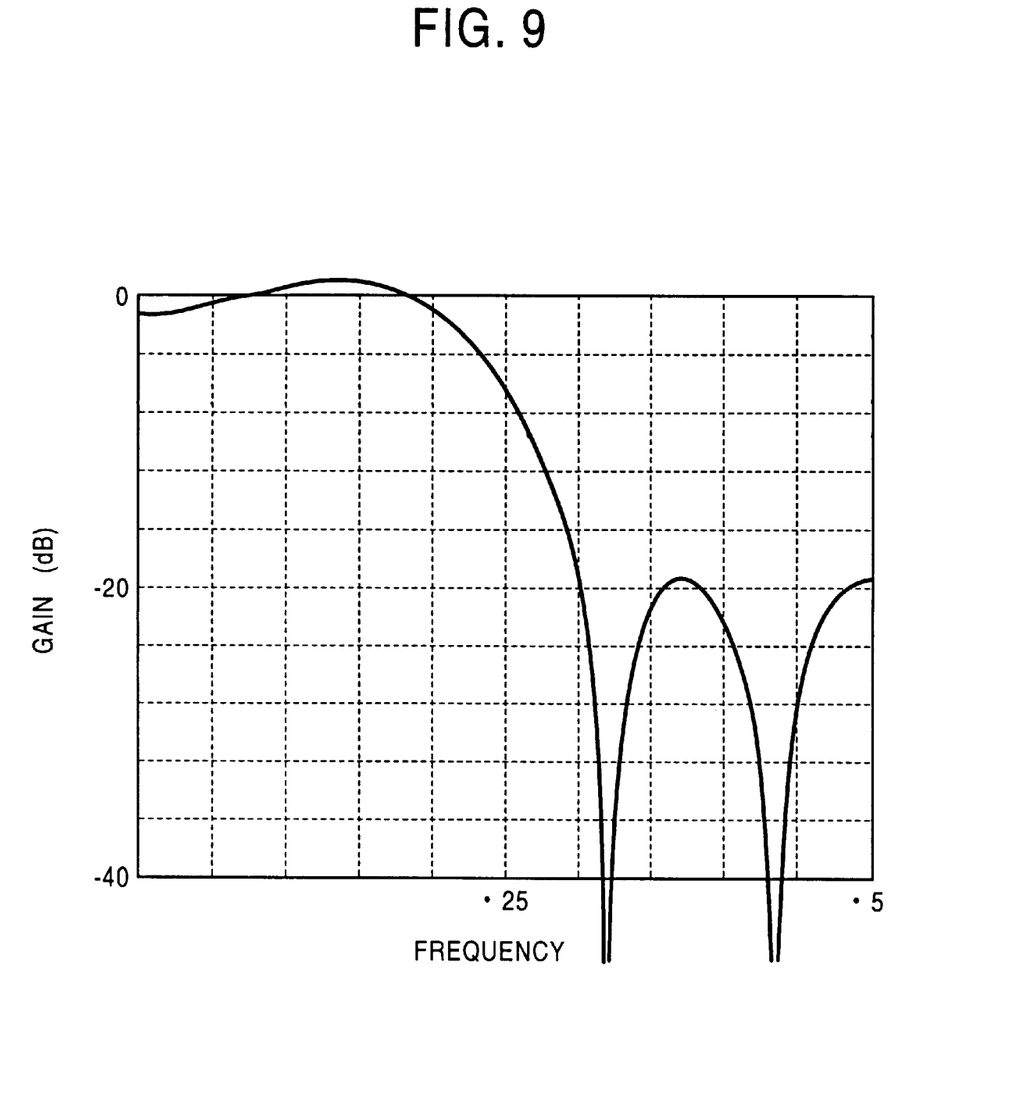

FIGS. 7 to 9 show other examples of the frequency characteristic of the filter processor 2b. If a filter coefficient set Cf2, Cf3, or Cf4 is supplied from the information amount prediction processor 2a, a frequency characteristic such as that shown in FIG. 7, 8, or 9 is set according to the filter coefficient set Cf2, Cf3, or Cf4, as is the example shown in FIG. 6.

Different cutoff frequencies are thereby set. That is, the cutoff frequency set by using the filter coefficient set Cf1 is the highest, and the cutoff frequencies set by using the filter coefficient sets Cf2, Cf3, and Cf4 are successively reduced relatively in this order.

Figure 10A:
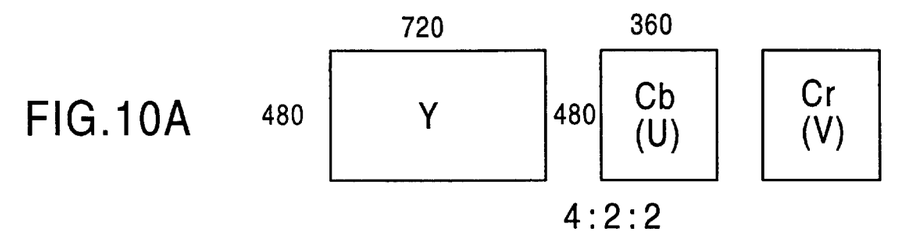
FIGS. 10A through 10E are diagrams showing converted resolutions of thinning-out processor 2c of the example shown in FIG. 2.

FIGS. 10A through 10E show the number of pixels converted by the thinning-out processor 2c. Image data in which all pixels have brightness signal Y, color difference signal Cb and color difference signal Cr is referred to as 4:4:4 image data. From 4:4:4 image data, color difference signals Cb and Cr are thinned out to halves in the horizontal direction to obtain 4:2:2 image data (FIG. 10A). Color difference signals Cb and Cr are further thinned out to halves in the vertical direction to obtain 4:2:0 image data (FIG. 10B) in which four pixels have one color difference signal Cb and one color difference signal Cr.

In this embodiment of the present invention, this 4:2:0 image data is used as basic image data. Since the DCT 3a processes image data with respect to 16×16 macro blocks, it is necessary for the pre-processing circuit 2 to output image data in which the number of pixels along each side is a multiple of 16 after thinning-out. In this embodiment, therefore, 704×480 pixels (FIG. 10B) are set as a basic number of pixels.

Figure 10B:
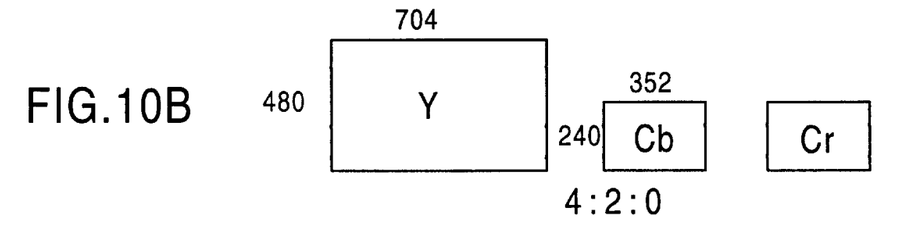

The thinning-out processor 2c changes the resolution by thinning out both the brightness signal and the color difference signals according to the number of pixels supplied from the information amount prediction processor 2a. However, if the number of pixels supplied from the information amount prediction processor 2a and the number of pixels of the input image are equal to each other, the thinning-out processor 2c outputs the input image without changing the same.

Figure 10C:
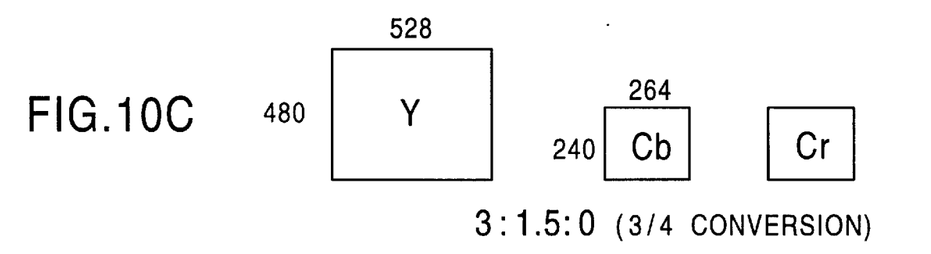
Figure 10D:
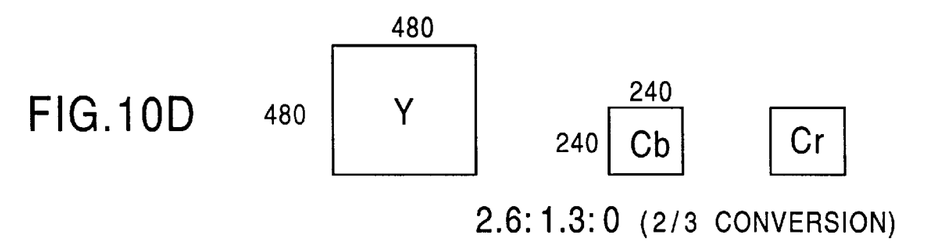
Figure 10E:
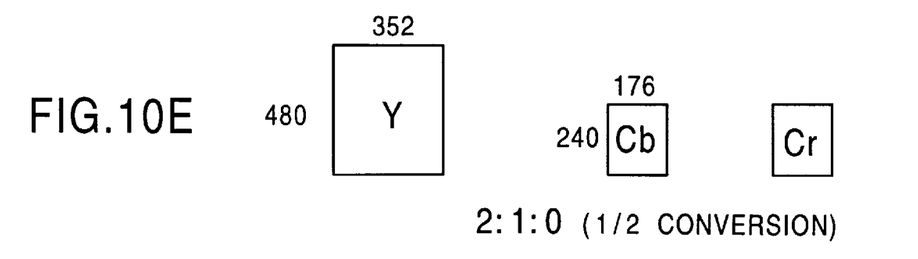

For example, 4:2:0 image data has brightness signal Y for 704×480 pixels and two color difference signals Cb and Cr for 352×240 pixels. Image data obtained by thinning out the 4:2:0 image data to ¾ in the horizontal direction has brightness signal Y for 528×480 pixels and color difference signals Cb and Cr for 264×240 pixels (FIG. 10C). Image data obtained by thinning out the 4:2:0 image data to about ⅔ in the horizontal direction has brightness signal Y for 480×480 pixels and color difference signals Cb and Cr for 240×240 pixels (FIG. 10D). Image data obtained by thinning out the 4:2:0 image data to ½ in the horizontal direction has brightness signal Y for 352×480 pixels and color difference signals Cb and Cr for 176×240 pixels (FIG. 10E).

The basic 4:2:0 image data (704×480 pixels) has, in the non-compressed state, an amount of information of about 122 Mbits/sec (=(704×480+352×240×2)×8 bits (1/30 sec)). The image data after thinning-out to ¾ (FIG. 10C), for example, has an amount of information of about 91 Mbits/sec (=(528×480+264×240×2)×8 bits (1/30 sec)). Similarly, the image data after thinning-out to ⅔ (FIG. 10D) has an amount of information of about 83 Mbits/sec (=(480×480+240×240×2)×8 bits (1/30 sec)) and the image data after thinning-out to ½ (FIG. 10E) has an amount of information of about 61 Mbits/sec (=(352×480+176×240×2)×8 bits (1/30 sec)).

A frame presupposed by the information amount prediction processor 2a to have a large amount of information after compression is processed by the above-described filtering and thinning-out processing to reduce the amount of image data before compression processing.

Figure 11:
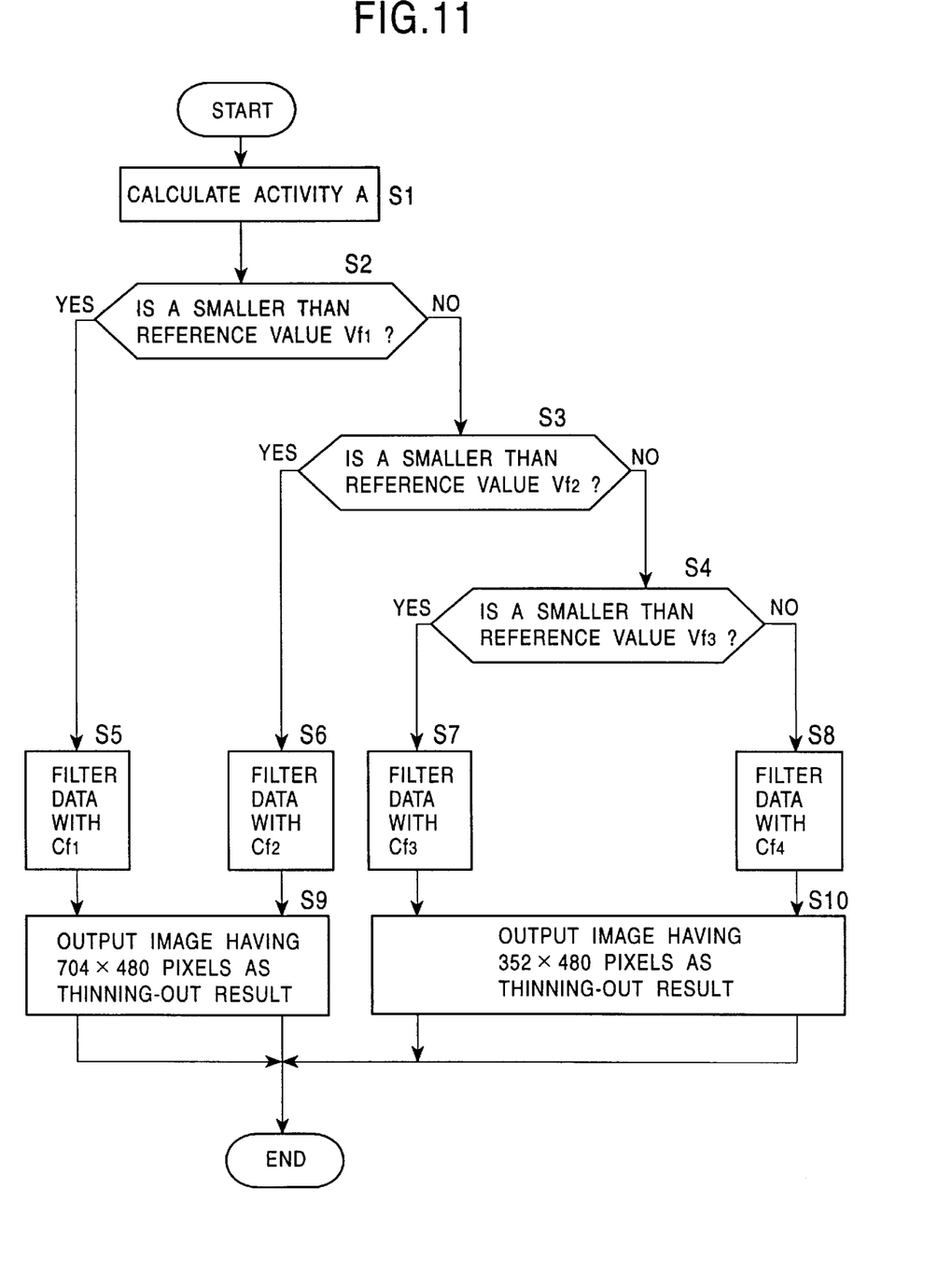
FIG. 11 is a flowchart of processing in the example shown in FIG. 2.

The operation of the above-described example of the pre-processing unit 2 will now be described with reference to the flowchart of FIG. 11.

First, in step S1, the information amount prediction processor 2a calculates the activity A of input image data. In step S2, the information amount prediction processor 2a compares the activity A with a first reference value Vf1. If the activity A is smaller than the predetermined first reference value Vf1, that is, the complexity of the image is low, the process moves to step S5 and the information amount prediction processor 2a supplies the filter processor 2b with the filter coefficient set Cf1 for setting the highest cutoff frequency. The filter processor 2b filters the image data (cuts high-frequency components), for example, with the frequency characteristic shown in FIG. 6 corresponding to the filter coefficient set Cf1, and outputs the filtered image data to the thinning-out processor 2c. The process then advances to step S9 and the thinning-out processor 2c outputs image data having 704×480 pixels to the compressor unit 3. That is, in this case, the thinning-out processor 2c outputs the input image data without thinning out the data.

If it is determined in step S2 that the activity is larger than the first reference value Vf1, the process advances to step S3 and the information amount prediction processor 2a compares the activity A with a predetermined second reference value Vf2. If the activity A is smaller than the reference value Vf2, that is, the complexity of the image is slightly high, the process moves to step S6 and the information amount prediction processor 2a supplies the filter processor 2b with the filter coefficient set Cf2. The filter processor 2b filters the image data, for example, with the frequency characteristic shown in FIG. 7 corresponding to the filter coefficient set Cf2 (at a cutoff frequency lower than that shown in FIG. 6), and outputs the filtered image data to the thinning-out processor 2c. The process then advances to step S9 and the thinning-out processor 2c outputs image data having 704×480 pixels to the compressor unit 3. That is, also in this case, the thinning-out processor 2c outputs the input image data without thinning out the data.

If it is determined in step S3 that the activity is larger than the predetermined second reference value Vf2, the process advances to step S4 and the information amount prediction processor 2a compares the activity A with a predetermined third reference value Vf3. If the activity A is smaller than the reference value Vf3, that is, the complexity of the image is significantly high, the process moves to step S7 and the information amount prediction processor 2a supplies the filter processor 2b with the filter coefficient set Cf3. The filter processor 2b filters the image data, for example, with the frequency characteristic shown in FIG. 8 corresponding to the filter coefficient set Cf3 (at a cutoff frequency lower than that shown in FIG. 7), and outputs the filtered image data to the thinning-out processor 2c. The process then advances to step S10 and the thinning-out processor 2c performs ½ conversion (shown in FIG. 10E) as thinning-out processing and outputs image data having 352×480 pixels to the compressor unit 3.

If it is determined in step S4 that the activity is larger than the reference value Vf3, that is, the complexity of the image is markedly high, the process moves to step S8 and the information amount prediction processor 2a supplies the filter processor 2b with the filter coefficient set Cf4. The filter processor 2b filters the image data, for example, with the frequency characteristic shown in FIG. 9 corresponding to the filter coefficient set Cf4 (at a cutoff frequency lower than that shown in FIG. 8), and outputs the filtered image data to the thinning-out processor 2c. The process then advances to step S10 and the thinning-out processor 2c performs ½ conversion (shown in FIG. 10E) as thinning-out processing and outputs image data having 352×480 pixels to the compressor unit 3.

Thus, the complexity (activity) of an image is calculated and the frequency characteristics and the number of pixels are controlled according to the complexity, thereby enabling the image to be transmitted with a least deterioration in image quality in the range of performance of the compressor unit 3 (and also in the range of performance of the expander unit 7).

Figure 12A:
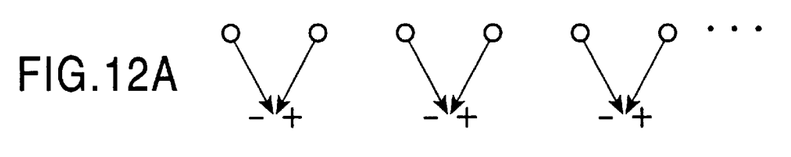
FIGS. 12A through 12D are diagrams for explaining the principle of calculation of activity.

In the above-described embodiment, the activity is calculated by an activity calculation circuit such as that shown in FIG. 3 from the differences between pairs of pixels adjacent in the horizontal direction as shown in FIG. 4. However, the arrangement may alternatively be such that the calculation circuit 22 shown in FIG. 3 is operated in a cycle twice the length of the time intervals at which the image data is input, the absolute value of the difference between each of adjacent pairs of pixel data items output from the adder 23 is calculated in every other clock cycle as shown in FIG. 12A, and the sum total of the absolute values is calculated to be output as activity. The activity A in this case can be expressed by the following equation:

$$A = \sum_{j=1}^{n} \sum_{i=1}^{m/2} | d(2i, j) - d(2i-1, j) |$$

Figure 13:
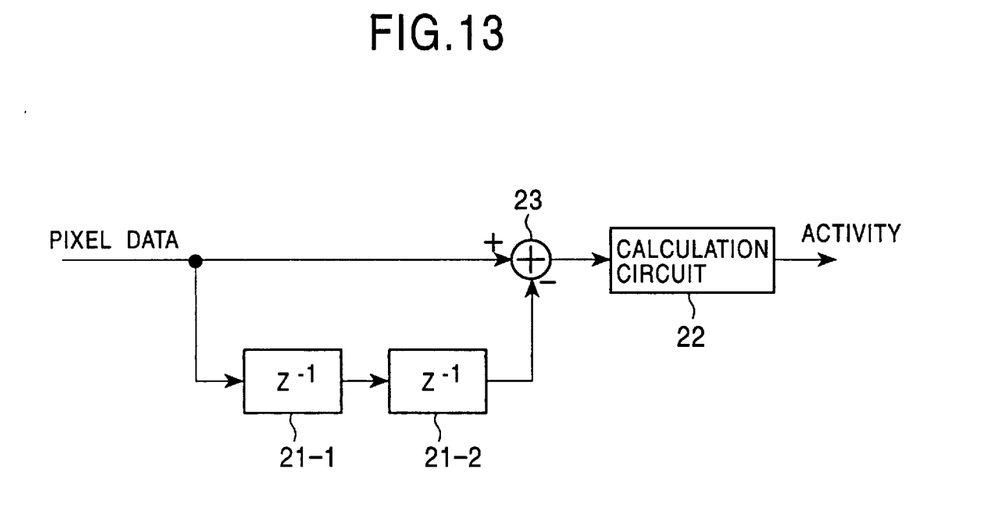
FIG. 13 is a block diagram showing the configuration of another example of the activity calculation circuit incorporated in information amount prediction processor 2a in the example shown in FIG. 2.

FIG. 13 shows the configuration of another example of the activity calculation circuit incorporated in the information amount prediction processor 2a. In this example, each of pixel data items input in sequential order is held for one clock period by a delay element 21-1. When the next pixel data item is input, the pixel data item held by the delay element 21-1 is supplied to a subsequent delay element 21-2. When the further following pixel data item is input, the pixel data item held by the delay element 21-2 is supplied to an adder 23.

Figure 12B:
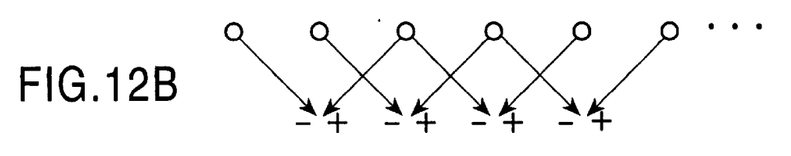

The adder 23 calculates the difference between the pixel data item held by the delay element 21-2 and the pixel data item newly input, thus obtaining the difference between each of pairs of pixel data items combined alternately in the horizontal direction, as shown in FIG. 12B. A calculation circuit 22 calculates the absolute value of this difference. The calculation circuit 22 calculates the absolute values with respect to all the pixel data in one frame and outputs the sum total of the absolute values as activity.

The activity A calculated in this example can be expressed by the following equation:

$$A = \sum_{j=1}^{n} \sum_{i=3}^{m} |d(i,j) - d(i-2,j)|$$

Figure 12C:
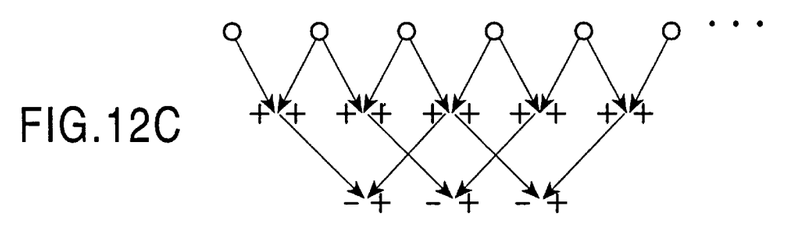
Figure 12D:
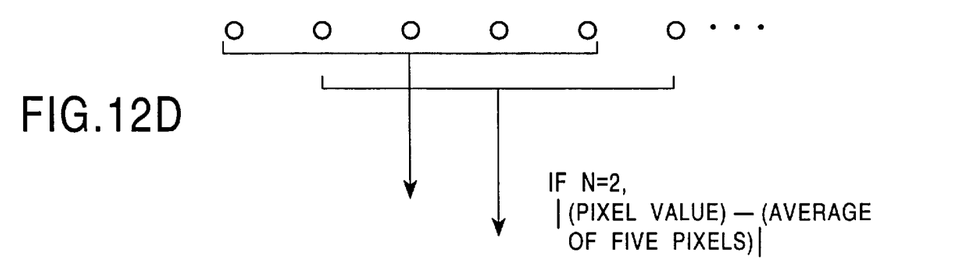
Figure 14:
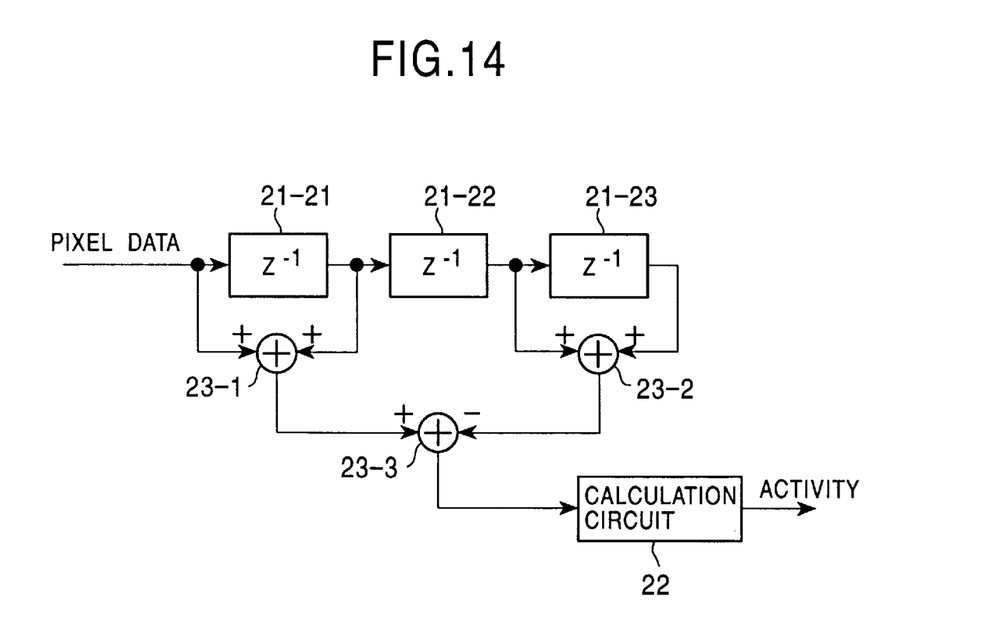
FIG. 14 is a block diagram showing the configuration of a further example of the activity calculation circuit incorporated in information amount prediction processor 2a in the example shown in FIG. 2.

FIG. 14 shows the configuration of a further example of the activity calculation circuit. Each of pixel data items supplied from the image input unit 1 is input to a delay element 21-21 in one clock cycle. When the next pixel data item is input, the pixel data items held by delay elements 21-21, and 21-22 are respectively output to subsequent delay elements 21-22, and 21-23. In this activity calculation circuit, as shown in FIG. 12C, the held three pixel data items and the newly-input pixel data item, i.e., four successive pixel data items, are used to calculate a change of the pixel value in one clock cycle.

After the pixel data items have been held by the three delay elements 21-21 to 21-23, an adder 23-1 calculates the sum of the pixel data item newly input and the pixel data item held by the delay element 21-21. Also, an adder 23-2 calculates the sum of the pixel data item held by the delay element 21-22 and the pixel data item held by the delay element 21-23. Next, an adder 23-3 calculates the difference between the values calculated by the two adders 23-1 and 23-2 and outputs this difference to a calculation circuit 22. The calculation circuit 22 calculates the absolute value of this difference. The calculation circuit 22 calculates the absolute values with respect to all the pixel data in one frame and outputs the sum total of the absolute values as activity.

The activity A calculated in this example can be expressed by the following equation:

$$A = \sum_{j=1}^{n} \sum_{i=4}^{m} |d(i,j) + d(i-1,j) - (d(i-2,j) + d(i-3,j))|$$

Figure 15:
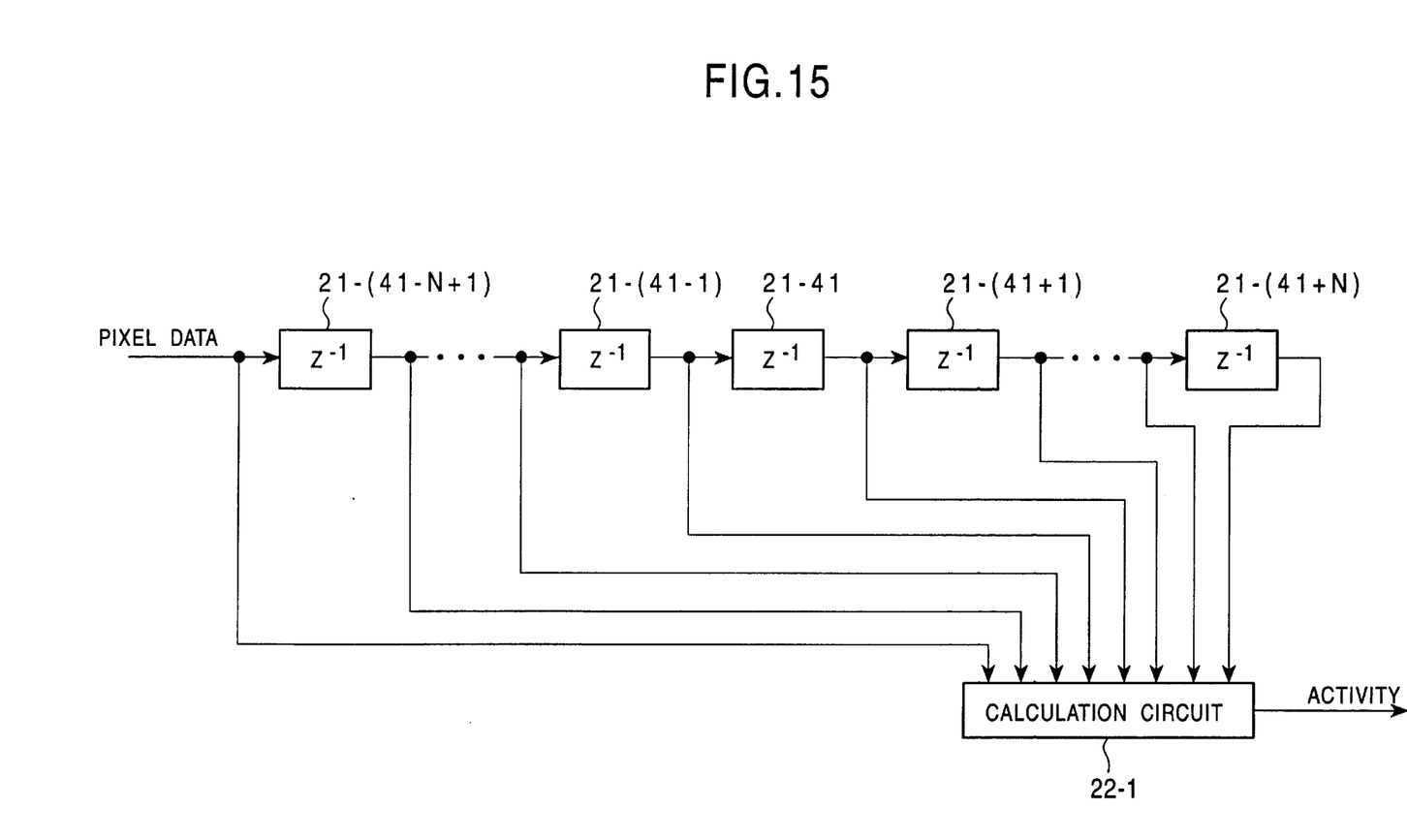
FIG. 15 is a block diagram showing the configuration of a still further example of the activity calculation circuit incorporated in information amount prediction processor 2a in the example shown in FIG. 2.

FIG. 15 shows the configuration of a still further example of the activity calculation circuit. A pixel data item is input to a delay element 21–(41–N+1) in one clock cycle. When a subsequent image data item is input, the pixel data item held by the delay element 21–(41–N+1) is output to a subsequent delay element 21–(41–N+2). Also, pixel data items held by delay elements 21–(41–N+2) to 21–(41+N–1) are output to subsequent delay elements 21–(41–M+3) to 21–(41+N).

The pixel data items held by 2N delay elements 21–(41–N+1) to 21–(41+N) and a pixel data item newly input, i.e., a total of successive (2N+1) pixel data items, are output to a calculation circuit 22-1 in one clock cycle. The calculation circuit 22-1 calculates the average of these (2N+1) pixel data items. Next, the calculation circuit 22-1 calculates the absolute value of the difference between the average value and the central pixel data item in the (2N+1) pixel data items (i.e., the pixel data item held by the delay element 21-41), calculates the absolute values with respect to all the pixel data in one frame and outputs the sum total of the calculated absolute values as activity.

The activity A calculated in this example can be expressed by the following equation:

$$A = \sum_{j=1}^{n} \sum_{i=N+1}^{m-N} |d(i,j) - \langle d(i,j) \rangle|$$

<d(i,j)> in this equation indicates the average of the (2N+1)-pixel values and can be expressed as follows:

$$\langle d(i,j) \rangle = \sum_{P=-N}^{N} \frac{d(i+P,j)}{2N+1}$$

The activity in the above-described examples of the activity calculation circuit is calculated from the differences between the values of pixels arranged in the horizontal direction. Alternatively, activity may be calculated by the differences between the values of pixels arranged in the vertical direction.

The above-described example of the filter processor 2b employed is a unidimensional digital filter. However, a two-dimensional digital filter may alternatively be used as the filter processor 2b. In the above-described embodiment, the unit of data as a processing object is a frame. However, the present invention can also be applied to processing of a unit of data corresponding to a field. Essentially, a unit corresponding to the entire picture area is processed.

In the image signal processor and the image signal processing method described above, activity representing the complexity of an image in one picture formed by a digital image signal is calculated and the digital image signal is converted according to the activity so that the amount of information before compression is reduced. In this manner, a deterioration in image quality can be limited by reducing mosquito noise and block noise generated at the time of compression to a negligible level even if the compression coding rate cannot be set to a substantially large value.

What is claimed is:

1. An apparatus for processing an image signal, comprising:

calculation means for calculating activity as between different pictures of a digital image signal;

conversion means for converting the digital image signal according to the activity so that the amount of information at the time of compression of the digital image signal is reduced; and compression means for compressing the converted digital image signal at a designated coding rate, wherein said conversion means controls the number of pixels in one picture of the digital image signal according to the activity.

2. An apparatus according to claim 1, wherein said conversion means controls a frequency characteristic of the digital image signal according to the activity.

3. The apparatus of claim 1, wherein said conversion means comprises:

a finite impulse response digital filter operative to control a frequency characteristic of the digital image signal according to the activity.

4. A method of processing an image signal, comprising the steps of:

calculating activity between different pictures of a digital image signal;

converting the digital image signal according to the activity so that the amount of information at the time of compression of the digital image signal is reduced; and compressing the converted digital image signal at a designated coding rate, wherein said step of converting controls the number of pixels in one picture of the digital image signal according to the activity, in relation to a frequency characteristic of the digital image signal.

5. An apparatus for processing an image signal, comprising:

a prediction processor for calculating activity as between different pictures of a digital image signal;

a filter for filtering the digital image signal to control a frequency characteristic of the digital image signal according to the activity;

a processor for controlling the number of pixels in one picture of the filtered digital image signal according to the activity; and a compressor for compressing the pixel controlled filtered digital image signal.

6. The apparatus of claim 5, wherein said filter comprises:

a finite impulse response digital filter.

* * * * *